(12) United States Patent
Shusterman et al.

(10) Patent No.: US 10,692,134 B2
(45) Date of Patent: *Jun. 23, 2020

(54) SYSTEM AND METHOD ENABLING SEARCHING FOR ITEMS, LISTINGS, OR PRODUCTS BASED ON LISTING ACTIVITY

(71) Applicant: eBay Inc., San Jose, CA (US)

(72) Inventors: Richard Aaron Neal Shusterman, Los Gatos, CA (US); Vinh Thu Pham, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 16/037,733

(22) Filed: Jul. 17, 2018

(65) Prior Publication Data

US 2018/0322568 A1 Nov. 8, 2018

Related U.S. Application Data

(63) Continuation of application No. 12/510,614, filed on Jul. 28, 2009, now Pat. No. 10,055,786.

(51) Int. Cl.
*G06Q 30/00* (2012.01)
*G06Q 30/08* (2012.01)
*G06F 16/9535* (2019.01)
*G06Q 30/06* (2012.01)

(52) U.S. Cl.
CPC ......... *G06Q 30/08* (2013.01); *G06F 16/9535* (2019.01); *G06Q 30/0631* (2013.01); *G06Q 30/0641* (2013.01)

(58) Field of Classification Search
CPC ..................................................... G06Q 30/08
See application file for complete search history.

(56) References Cited

U.S. PATENT DOCUMENTS

| | | | |
|---|---|---|---|
| 7,346,543 B1 | 3/2008 | Edmark | |
| 7,490,056 B2 | 2/2009 | Nash | |
| 10,055,786 B2 | 8/2018 | Shusterman et al. | |
| 2001/0049648 A1 | 12/2001 | Naylor et al. | |
| 2003/0217060 A1 | 11/2003 | Stockton | |
| 2006/0047425 A1 | 3/2006 | Fukumi et al. | |
| 2006/0106793 A1 | 5/2006 | Liang | |

(Continued)

FOREIGN PATENT DOCUMENTS

WO 2011/014573 A1 2/2011

OTHER PUBLICATIONS

Booked! (Feb. 5, 2011). Indian Express Retrieved from http://search.proquest.com/docview/849281616?accountid=14753.*

(Continued)

*Primary Examiner* — Kathleen Palavecino
(74) *Attorney, Agent, or Firm* — Shook, Hardy & Bacon LLP (57) ABSTRACT

A system and method for providing a listing activity engine for online computer users is disclosed. A particular embodiment includes: accessing a plurality of listings corresponding to items offered on a host site; accessing listing activity level information related to the plurality of listings; producing search results that include only matched listings of the plurality of listings with activity level information indicating activity less than a pre-determined listing activity threshold; and displaying the search results to a user.

20 Claims, 9 Drawing Sheets

(56) References Cited

U.S. PATENT DOCUMENTS

| | | | |
|---|---|---|---|
| 2007/0016599 | A1 | 1/2007 | Plastina et al. |
| 2007/0055577 | A1 | 3/2007 | Ashton |
| 2007/0100709 | A1 | 5/2007 | Lee et al. |
| 2007/0130129 | A1 | 6/2007 | Wagle |
| 2007/0174135 | A1 | 7/2007 | Lynch |
| 2007/0174180 | A1 | 7/2007 | Shin |
| 2007/0219994 | A1 | 9/2007 | Lemelson |
| 2007/0276812 | A1 | 11/2007 | Rosen |
| 2008/0243632 | A1 | 10/2008 | Kane et al. |
| 2008/0263013 | A1 | 10/2008 | Hopkins |
| 2008/0306853 | A1 | 12/2008 | Mclemore et al. |
| 2009/0043692 | A1 | 2/2009 | Pippuri et al. |
| 2009/0171813 | A1 | 7/2009 | Byrne et al. |
| 2009/0187485 | A1 | 7/2009 | Loui et al. |
| 2009/0217203 | A1 | 8/2009 | Aravamudan et al. |
| 2009/0249227 | A1 | 10/2009 | Clark et al. |
| 2009/0271368 | A1 | 10/2009 | Channell |
| 2010/0043037 | A1 | 2/2010 | Beyabani et al. |
| 2010/0094714 | A1 | 4/2010 | Varon |
| 2011/0029408 | A1 | 2/2011 | Shusterman et al. |

OTHER PUBLICATIONS

Proquest Central, "Booked!", Retrieved from the Internet URL: <http://search.proquest.com/docview/849281616?accountid=14753>, Indian Express, Feb. 5, 2011, 1 page.

"Overstock.com", Retrieved from the Internet URL: <http:/Iweb.archive.org/web/20080415153357/auctions.overstock.com>, Accessed on Aug. 11, 2010, 4 pages.

Extended European Search Report received for European Patent Application No. 10804997.4, dated Feb. 22, 2013, 5 pages.

Applicant Initiated Interview Summary received for U.S. Appl. No. 12/510,614, dated Feb. 21, 2018, 3 pages.

Applicant Initiated Interview Summary received for U.S. Appl. No. 12/510,614, dated Jun. 26, 2017, 3 pages.

Final Office Action received for U.S. Appl. No. 12/510,614, dated Dec. 22, 2017, 9 pages.

Final Office Action received for U.S. Appl. No. 12/510,614, dated Jan. 31, 2011, 17 pages.

Final Office Action received for U.S. Appl. No. 12/510,614, dated Jun. 17, 2015, 9 pages.

Final Office Action received for U.S. Appl. No. 12/510,614, dated May 31, 2016, 10 pages.

Non-Compliant or Non-Responsive Amendment received for U.S. Appl. No. 12/510,614, dated Sep. 21, 2017, 6 pages.

Non-Final Office Action received for U.S. Appl. No. 12/510,614, dated Aug. 17, 2010, 21 pages.

Non-Final Office Action received for U.S. Appl. No. 12/510,614, dated Dec. 4, 2015, 9 pages.

Non-Final Office Action received for U.S. Appl. No. 12/510,614, dated Mar. 31, 2017, 12 pages.

Non-Final Office Action received for U.S. Appl. No. 12/510,614, dated May 19, 2014, 16 pages.

Non-Final Office Action received for U.S. Appl. No. 12/510,614, dated Nov. 28, 2014, 10 pages.

Notice of Allowance received for U.S. Appl. No. 12/510,614, dated Apr. 18, 2018, 8 pages.

Response to Final Office Action filed on Aug. 4, 2016 for U.S. Appl. No. 12/510,614, dated May 31, 2016, 24 pages.

Response to Final Office Action filed on Jun. 30, 2011 for U.S. Appl. No. 12/510,614, dated Jan. 31, 2011, 10 pages.

Response to Final Office Action filed on Mar. 20, 2018 for U.S. Appl. No. 12/510,614, dated Dec. 22, 2017, 11 pages.

Response to Final Office Action filed on Sep. 1, 2015 for U.S. Appl. No. 12/510,614, dated Jun. 17, 2015, 25 pages.

Response to Non-Final Office Action filed on Apr. 27, 2015 for U.S. Appl. No. 12/510,614, dated Nov. 28, 2014, 31 pages.

Response to Non-Final Office Action filed on Aug. 27, 2014 for U.S. Appl. No. 12/510,614, dated May 19, 2014, 14 pages.

Response to Non-Final Office Action filed on Dec. 17, 2010 for U.S. Appl. No. 12/510,614, dated Aug. 17, 2010, 10 pages.

Response to Non-Final Office Action filed on Jun. 30, 2017 for U.S. Appl. No. 12/510,614, dated Mar. 31, 2017, 12 pages.

Response to Non-Final Office Action filed on May 4, 2016 for U.S. Appl. No. 12/510,614, dated Dec. 4, 2015, 16 pages.

Response to Notice of Non-Responsive Amendment filed on Nov. 21, 2017 for U.S. Appl. No. 12/510,614, dated Sep. 21, 2017, 13 pages.

Response to Amendment Rule 312 filed on Jun. 5, 2018 for U.S. Appl. No. 12/510,614, dated Apr. 18, 2018, 8 pages.

Response to Amendment under Rule 312 dated Jun. 18, 2018 for U.S. Appl. No. 12/510,614, filed on Jun. 5, 2018, 1 page.

International Preliminary Report on Patentability received for PCT Application No. PCT/US2010/043579, dated Feb. 9, 2012, 8 pages.

International Search Report received for PCT Application No. PCT/US2010/043579, dated Sep. 14, 2010, 2 pages.

International Written Opinion received for PCT Application No. PCT/US2010/043579, dated Sep. 14, 2010, 6 pages.

\* cited by examiner

Be the first to see these listings!

3 Bedroom, 2 Bathroom Home for Sale i... ( $460,000.00 )

AKC Bernese Mt. puppies ( $1,100.00 )

EXPOSED BRICK VERY BRIGHT UNION SQUARE! ( $2,800.00 )

Renovated Floor Through ( $1,300.00 )

ENGLISH BULLDOG FEMALES 8 &10 WEEKS ( $1,800.00 )

SYSTEM AND METHOD ENABLING SEARCHING FOR ITEMS, LISTINGS, OR PRODUCTS BASED ON LISTING ACTIVITY

RELATED APPLICATIONS

This patent application is a continuation of U.S. patent application Ser. No. 12/510,614, filed Jul. 28, 2009, which is incorporated herein by reference in its entirety.

BACKGROUND

Consumer-focused websites, which either sell items directly or offer consumer marketplaces (e.g., sites), must provide an easy way for online users to find items that are offered (e.g., listings, advertisements, promotions, etc.). If a user/consumer cannot find an item offered for sale, the consumer will not be able to purchase or bid on the item. It has been shown that items displayed on the first page or in the first few pages of search results have an exponentially higher selection rate than even those items on the second page of the search results. A 2006 report from iProspect on search engine user behaviors shows that while 62% of users clicked links in the first page of search results, only 28% clicked a link on the second page. This user behavior creates a disproportionate amount of attention to listings that appear on these first pages because a first page listing improves the chances of a successful sale compared with the listings that appear on the later pages of the search results. Therefore, it becomes increasingly important to provide users with a variety of ways to display listings at the top of the search results (e.g., on the first page or in the first few pages of search results) to increase the likelihood of conversion (e.g., being clicked by a user).

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In one embodiment, a system and method for enabling searching for items, listings, or products based on listing activity is disclosed. In various example embodiments, a computer application aims to simplify and facilitate the shopping experience on a host site, such as a classified advertising site, an online commerce site, an auction site, or other product/service or broker site accessible via a conventional data network. Various embodiments are particularly useful for classified advertising sites where the timing and activity related to a posting of advertisements or listings can have relevance to the value of the advertisements or listings for both sellers and buyers. As used herein, the term 'listing' is considered to include any form of product or service advertisement (ad), listing, posting, offering, solicitation, and the like. A particular embodiment can use an application programming interface (API) Web application that can make use of host site search and other APIs to provide search results or suggest feature upgrades to buyers and/or sellers in a simpler and non-traditional format.

The various example embodiments described herein provide online users with functionality to find listings of interest based on listing activity, focusing on listings that are likely still available (e.g., listings that identify products or services that are still for sale or bid). A listing is likely still available if the listing has a low number of views or no views or a low number of replies or no replies. In other words, online listings that have not been seen or acted upon are likely still available listings. Listings with a low number of views or no views or a low number of replies or no replies can be denoted low-activity listings. Listings of a plurality of listings that were viewed or activated a number of times less than a pre-determined listing activity threshold can be designated low-activity listings. Additionally, other types of activities (or lack thereof) related to listings can be used to characterize a listing as a low-activity listing. For example, bid, offer, and watch activity can also be used to determine the activity level of a particular listing. Bid activity relates to the number of bids that may have been made on an item associated with a listing. Offer activity relates to the number of offers that may have been placed on an item associated with a listing. Watch activity relates to the number of users who may have indicated an interest in watching the activity for a particular item associated with a listing. In each of these cases, a pre-determined listing activity threshold can be defined and used to determine if particular listings are designated as low-activity listings. These low-activity listings likely relate to items that are still available for sale or bid, if the listing has been active on the host site for some time with few or no views, replies, bids, offers, or watches. Each listing on the host site has a corresponding seller, who may be more open to accepting feature upgrades or cost adjustments if the seller's listing has been active on the host site for some time with few or no views or replies. The various embodiments described herein provide the functionality for identifying and highlighting these low-activity listings.

Search results and listing activity search options can be customized according to listing activity and information related to particular products, listings, or advertisements. Buyers can be offered an opportunity to see low-activity listings. Sellers can be offered the opportunity to increase exposure and visibility for low-activity listings. As described in more detail below, various search options and monetization opportunities can be realized based on the various embodiments described herein.

Figure 1:
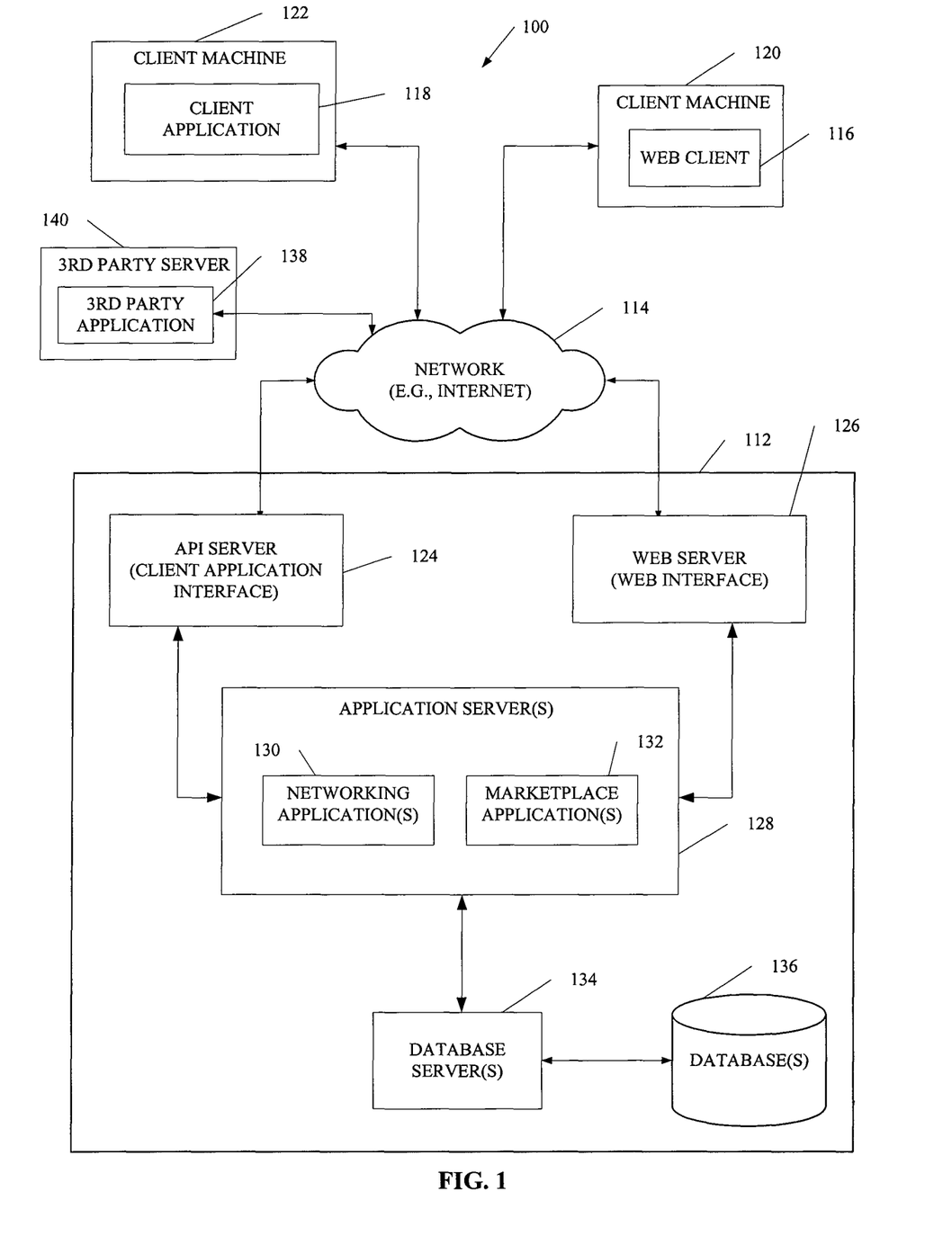
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a trading/commerce system where clients may communicate and exchange data with the trading/commerce system, and the data may pertain to various functions (e.g., online purchases) and aspects (e.g., managing social networks) associated with the network system 100. Although illustrated herein as a client-server architecture for simplicity, in other embodiments the network architecture may vary and include an architecture such as a peer machine in a peer-to-peer (or distributed) network environment.

Returning to FIG. 1, a data exchange platform, in an example form of a network-based provider (or host system/site) 112, provides server-side functionality, via a network 114 (e.g., the Internet) to one or more clients 120 and 122. The one or more clients may include users that may utilize the network system 100 and more specifically, the network-based provider 112, to exchange data over the network 114. These transactions may include transmitting, receiving (communicating) and processing data to and from the multitude of users. The data may include, but is not limited to, user preference information, user profile information, classified ad search queries, shopping or listing context information and/or identifiers, context data, notations (e.g., personal and public shopping notes), context filter data, shared electronic shopping carts, product and service reviews, product, service, manufacture, and vendor recommendations and identifiers, product and service listings associated with buyers and sellers, auction bids, feedback, and so forth. In one embodiment, the user profile information can be associated with one or more contexts generated by a user or other users and maintained on the network-based provider 112. Data associated with a user profile, such as any of the data described above, may be publicly shared as determined by the originator of the data.

Turning specifically to the network-based marketplace 112, an application program interface (API) server 124 and a web server 126 are coupled to, and provide programmatic and web interfaces respectively to, one or more application servers 128. The application servers 128 host one or more networking application(s) 130 and marketplace application(s) 132. The application servers 128 are, in turn, shown to be coupled to one or more databases servers 134 that facilitate access to one or more databases 136.

In one embodiment, the web server 126 may send and receive data pertaining to a user profile or item listing via a toolbar installed on a browser application. The toolbar may allow for a user or a third party to, inter alia, create a new listing (a listing creator), selectively add a uniform resource locator (URL) or other information associated with the created listing, and create ancillary data associated with the listing. In other embodiments, the web server may serve a page or the API server 124 in conjunction with the client application 118 may provide the same or similar functionality as that described with reference to the toolbar. It may be noted that using a toolbar within an application such as a browser or stand-alone application is well known in the art.

The marketplace application(s) 132 may provide a number of marketplace functions and services (e.g., item listings, searching, advertisement, payment, etc.) to users that access the network-based marketplace 112. The networking application(s) 130 likewise may provide a number of consumer services, merchant services, or social networking services and functions to users. The networking application(s) 130 may allow a user to generate one or more contexts related to shopping or advertisement (ad) generation, which may include listings (e.g., for products and services) couched as a broad category associated with a consumer, a class of consumers, and/or an item (e.g., a product or service or a listing for a product or service) or class of items. Additionally, listings can be couched as associated with a specific consumer or a specific item. For example, listings in the form of a category could be, "digital cameras" or "plumbers." Similarly, a context can include a listing or user profile associated with a category of users or a specific user. For example, a user profile in the form of a category could be, "women over 40 years old" or "purchasers of digital cameras." An example of a user profile in a more specific form may be, "a user profile for John A. Smith of Akron, Ohio" or "purchasers of Canon digital cameras." The level of specificity may vary and is selectable by the listing creator or administrator of the listing activity engine of a particular embodiment. For example, a user profile can be as specific as a particular person or the listing associated with a make, model, additional specific attributes or features of a specific item or service offered for sale or lease.

In one embodiment, the networking application(s) 130 and marketplace application(s) 132 may provide a client (e.g., web client 116) with an interface that includes input fields for personality or item/listing attributes most commonly selected by other users as the most important or most determinative attributes related to the products/services which a user/consumer is seeking or selling. For example, a multitude of users may have indicated they thought the most important personality attributes for the user profile include information related to: 1) consumer/user need, 2) general consumer/user personality, 3) consumer/user shopping attitude, and 4) consumer/user budget. A multitude of other users may have indicated they thought the most important item attributes for a digital camera purchaser user profile include: 1) digital camera brand, 2) pixel count, 3) zoom, and 4) size. These user profile or listing attributes may be independently developed or discovered by the network-based marketplace 112 by processing the attribute data received from the multitude of users or may be based on the listing creator ranking the attributes or a combination thereof.

Additionally, users can create user preferences in their user profiles that specify the listings and ads they are interested in monitoring, based on low activity. For example, as described in more detail below, low-activity listings can be determined based on a variety of listing activity metrics described herein. Users can create user preferences in their user profiles to specify that they are interested in monitoring these low-activity listings. Based on the pre-set user preference for monitoring low-activity listings, a particular embodiment can display for the user the set of low-activity listings when the user visits the host site. Additionally, based on the pre-set user preference for monitoring low-activity listings, the particular embodiment can automatically send an email or SMS text message at periodic intervals to notify the user of the presence of the low-activity listings.

While the networking application(s) 130 and the marketplace application(s) 132 are shown in FIG. 1 to form part of the network-based marketplace 112, it will be appreciated that, in alternative embodiments, the networking application(s) 130 may form part of a social networking service that is separate and distinct from the network-based marketplace 112.

FIG. 1 also illustrates a third party application 138, executing on a third party server machine 140, as having programmatic access to the network-based marketplace 112 via the programmatic interface provided by the API server 124. For example, the third party application 138 may, utilizing information retrieved from the network-based marketplace 112, support one or more features or functions on a website hosted by the third party. The third party website may, for example, provide one or more networking, marketplace or payment functions that are supported by the relevant applications of the network-based marketplace 112.

Figure 2:
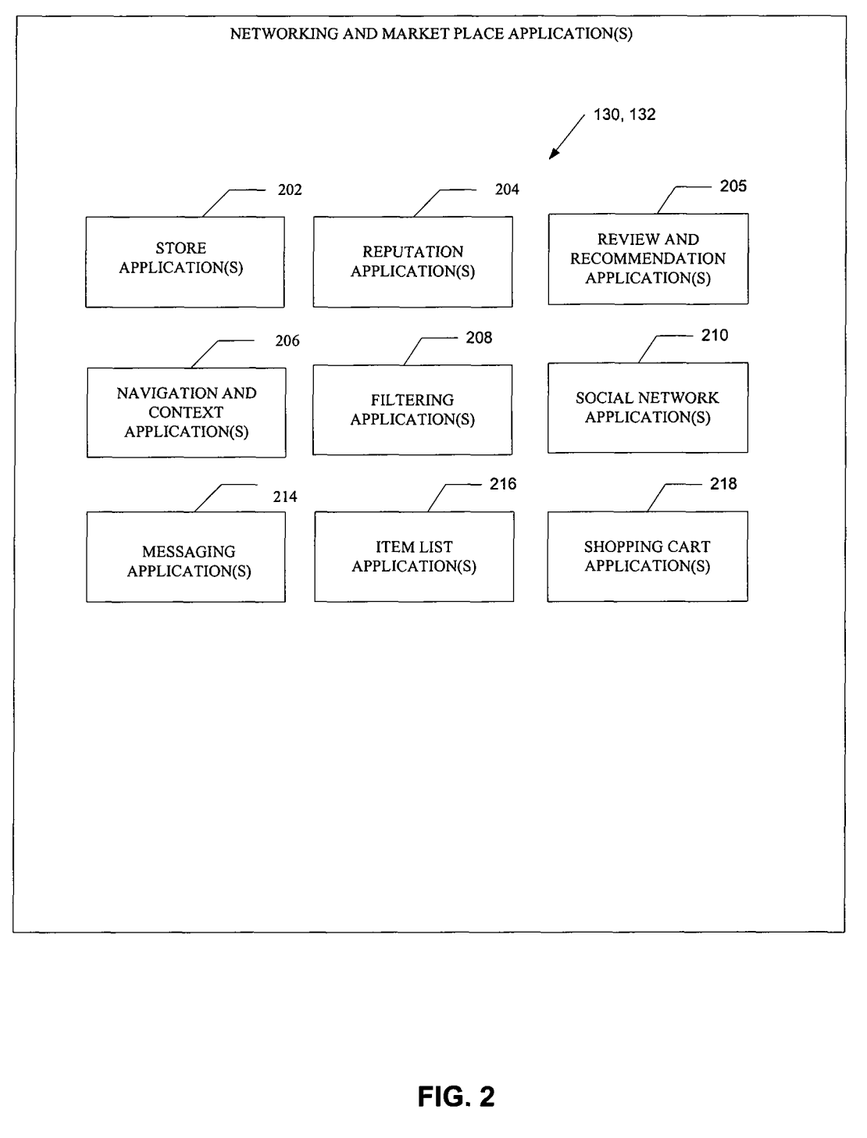
FIG. 2 is a block diagram illustrating an example embodiment of multiple network and marketplace applications, respectively, which are provided as part of a network-based marketplace.

FIG. 2 is a block diagram illustrating an example embodiment of multiple network and marketplace application(s) 130 and 132, respectively, which are provided as part of the network-based marketplace 112. The network-based marketplace 112 may provide a number of classified listings for goods and/or services, category-based shopping, social networking, and purchase and bidding systems, various levels of features provided for users, and price-setting mechanisms whereby a seller may list goods and/or services (e.g., for sale, bid, or lease) and a buyer may buy or bid on listed goods and/or services. A user profile and context associated with a listing in the network-based marketplace 112 may offer or provide information that may be helpful in assisting the listing activity engine of a particular embodiment in customizing the shopping or listing experience pertaining to the listing information (i.e., context). Among various embodiments, the recommendations, reviews, or research notes corresponding to the listing information may be directed from another user to one or more users desiring data associated with the listing information or the data may be provided from storage by the network and marketplace application(s) 130 and 132 based on the listing information provided by a user. The data may be provided based on a request from the listing creator or automatically pushed to the listing creator based on policy or a user configuration file.

To this end, the network and marketplace application(s) 130 and 132, respectively, are shown to include one or more application(s) which support the network-based marketplace 112 and, more specifically, the generation and maintenance of one or more listings provided by users of the network-based marketplace 112 or the listing activity engine. These applications can include support for activities associated with the listing information, including storing and retrieving user notes, web sites (URLs), links associated with related tags, research and notes from other users and community members, related community groups, vendors, localized geographic data for listings (e.g., regional consumer purchasing patterns), and so forth. Additionally, the various applications may support social networking functions, including building and maintaining the community groups created by a user, which may be helpful in providing various types of data (e.g., reviews, notes, local services, consumer information, etc.) pertaining to the listing information.

Store application(s) 202 may allow sellers to group their listings (e.g., goods and/or services) within a "virtual" store, which may be branded and otherwise personalized by and for the sellers. Such a virtual store may also offer promotions, incentives and features that are specific and personalized to a relevant seller and consumer. In one embodiment, based on a user profile, the virtual store may list or sell an item or service related to a user's need based on the user profile.

Reputation application(s) 204 may allow parties that transact utilizing the network-based marketplace 112 to establish, build, and maintain reputations, which may be made available and published to potential trading partners. Consider that where, for example, the network-based marketplace 112 supports person-to-person trading, users may have no history or other reference information whereby the trustworthiness and/or credibility of potential trading partners may be assessed. The reputation application(s) 204 may allow a user (for example, through feedback provided by other transaction partners) to establish a reputation within the network-based marketplace 112 over time. Other potential trading partners may then reference such a reputation for the purposes of assessing credibility, trustworthiness, or the like. A user creating a listing and seeking reviews, research (e.g., notes, etc.), and recommendations associated with the listing may filter the result data from the search or context submission based on reputation data. For example, the listing viewer or creator may only want listing data such as reviews and research notes pertaining to sources with a greater than 3 out of 5 stars reputation rating.

In one embodiment, the network-based marketplace 112 includes review and recommendation application(s) 205. The social network application(s) 210 may work in conjunction with the review and recommendation application(s) 205 to provide a user interface to facilitate the entry of reviews of the listing data received from other users. A review may be a text entry of the community group member's opinion, a standard review form including check boxes indicating a level satisfaction, a combination of both, or the like. Recommendations may include a specific type of demographic, item, a specific brand or service for a type of item, a specific retailer for the item, or the like.

Navigation of the network-based marketplace 112 may be facilitated by one or more navigation and context application(s) 206. For example, a context application may, inter alia, enable key word searches of item listings associated with a context defined by a user profile of a particular consumer. The context can include an association between the user profile data in the user profile and item feature sets related to items in the item listings. The item listings can include listings from a group including products or services or both. The item feature set data and data defining the association between the user profile data in the user profile and item feature sets may be retrieved from the network-based marketplace 112 (e.g., databases 136 of FIG. 1) or from various other remote sources, such as other network sites, other users (e.g., experts or peers), and the like. In one embodiment, a toolbar installed on a browser application may be used for functions including interactive and navigation functions to create a new listing, selectively add a URL associated with the created listing, and create notations regarding research and general matters associated with the listing. These functions can also include functions to notify users of the presence of low-activity listings. As described herein, an embodiment can display for users a set of low-activity listings on request or automatically send an email or SMS text message when the presence of low-activity listings is detected. Additionally, functions can provide channels or streams, which can be pulled or pushed to display the low activity listings to a user. This channel or stream can display a scrolling view of low activity listings with listing photos and titles. A user can pause or rewind the scrolling list of low activity listings if the user sees a particular listing of interest. Users can also set a user preference parameter to specify that the scrolling list of low activity listings should freeze the display of listings if a particular keyword or attribute in a listing is matched to a pre-defined preference. These functions may be user accessible by many methods known in the art, including a web form interface (Hypertext Markup Language—HTML or embedded Java) or a stand-alone application interface. For example, a navigation application may include a browser that allows users via an associated user interface to browse a listing, various item listings, item feature sets, contexts, catalogues, inventories, social networks, and review data structures within the network-based marketplace 112. In one embodiment, the user interface includes selectable elements in the form of tabs to separate out various categories of listing data, which when selected generate a list associated with the category. For example, a tab for "My Notes," a tab for "Everyone's Notes," a tab for "Buy," and a tab for "Sell." Various other navigation applications (e.g., an external search engine) may be provided to supplement the search and browsing applications.

In one embodiment, using filtering application(s) 208, the user or listing activity engine may customize result data associated with listing search results. The filtering application(s) 208 may generate the result data according to one or more rules provided by the network-based marketplace 112 and the user receiving the filtered result data. For example, as discussed above with reference to the reputation application(s) 204, the user may only want the search results to match on item listings pertaining to item reviews from other users with a greater than 3 out of 5 stars reputation rating. In another example, the user may only want search results to match on item listings pertaining to item listings with a particular feature set or attribute set. For example, the user may only want result data for digital cameras with equal or greater than 5 megapixels. Additionally, the filtering rules may be combinable or modifiable to broaden or narrow the scope of the result data. The filtering application(s) 208 may also be used to implement rules for granting or allowing access to the user profile data.

Messaging application(s) 214 may be used for the generation and delivery of messages to users of the network-based marketplace 112. For example, the user may like a particular review or research from another user and may wish to contact the user for additional information. In one embodiment, the messaging application(s) 214 may be used in conjunction with the social network application(s) 210 to provide promotional and/or marketing information (e.g., targeted advertisements associated with a listing) to the user or a related user from vendors and community members that may have offerings related to the listing.

Item list application(s) 216 may be used in the network-based marketplace 112 by the user to create an item list based on selecting one or more items and services to purchase (or sell, auction, lease, or donate), which may be at least partially based on result data associated with the user's shopping experience. The item list application(s) 216 may be accessed via a user interface that allows the user to create and use the item list. Additionally, the user may selectively share this list within a community or to all users to gain or solicit additional data such as vendor recommendations for each purchase or vendor reviews for vendors that may be present in the list.

In one embodiment, electronic shopping cart application(s) 218 are used to create a shared electronic shopping cart used by a user to add and store items from a shopping list generated by the user (e.g., by making selections from a "Buy" tab). The electronic shopping cart application(s) 218 may facilitate the transactions for each item on the list by automatically finding the items in the electronic shopping cart across at least one or all of a set of vendors, a comparison shopping site, an auction site, other user's ads, and so forth. In one embodiment, a multitude of transactions may appear as one transaction based on the selection of "Bulk Purchase." In various embodiments, the selection criteria from which vendor or vendors may purchase from include, but are not limited to, criteria such as lowest cost, fastest shipping time, preferred or highest rated vendors or sellers, or any combination thereof.

It will be appreciated that one or more of the various example networking and marketplace application(s) 130, 132 may be combined into a single application including one or more modules. Further, in some embodiments, one or more applications may be omitted and additional applications may also be included.

Figure 3:
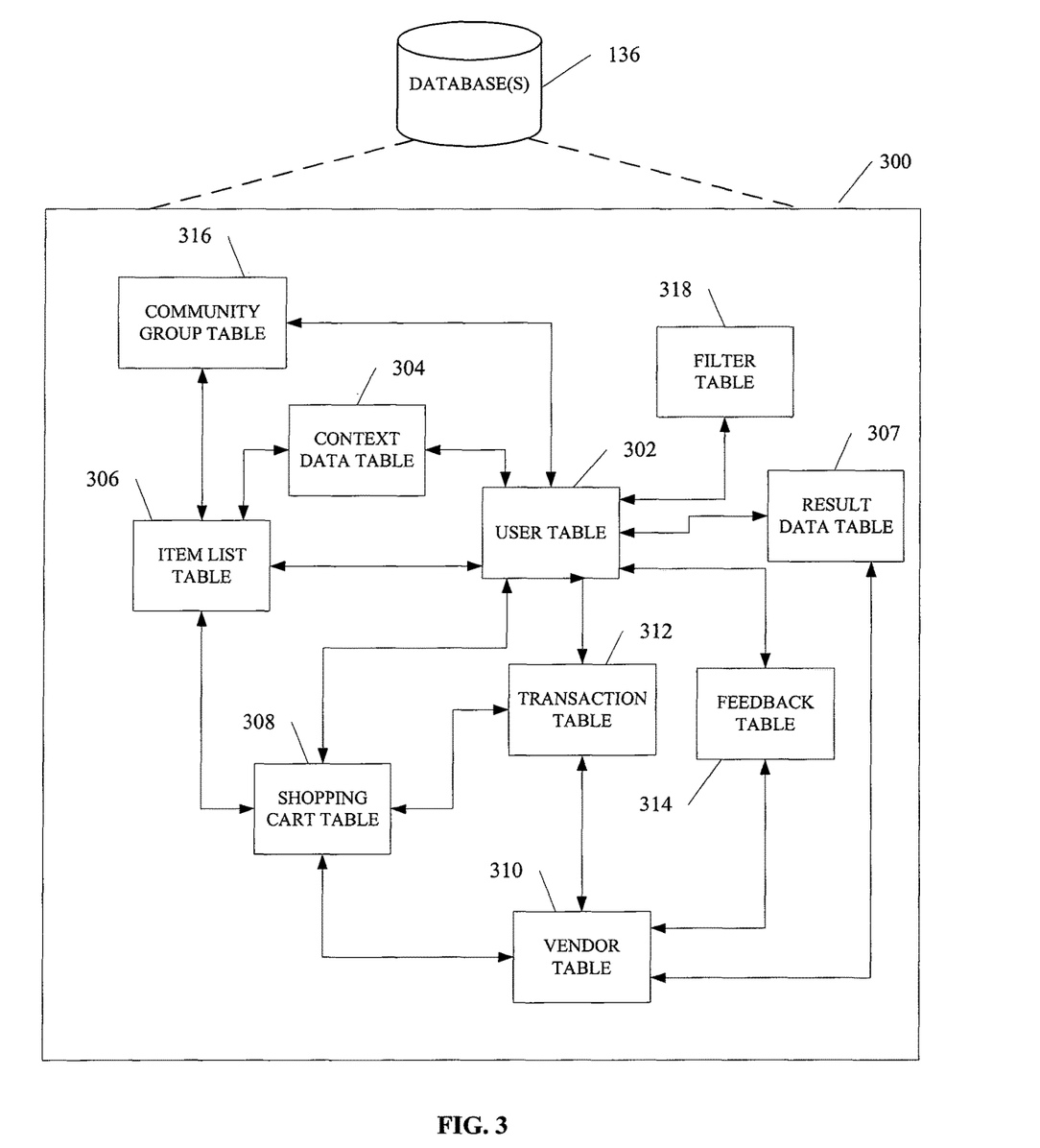
FIG. 3 is a high-level entity-relationship diagram, according to an example embodiment, illustrating various tables that may be maintained within a database to support networking and marketplace applications.

FIG. 3 is a high-level entity-relationship diagram, in accordance with an example embodiment, illustrating various tables 300 that may be maintained within the database(s) 136 (see FIG. 1), which may be utilized by and support the networking and marketplace application(s) 130 and 132, respectively. A user table 302 may contain a record for each registered user of the network-based marketplace 112, and may include identifier, address and financial instrument information pertaining to each such registered user. In one embodiment, a user operates as one or all of a listing creator, a seller, and a buyer, within the network-based marketplace 112.

The context data table 304 maintains a record of the one or more user profiles and/or listings created by or related to a user. As discussed above, this may include user profile identifiers and/or listing identifiers that may include words and/or phrases from the general to the specific for a consumer class, specific consumer, product/service class, or a specific product/service. Context data in context data table 304 can also include associations between the user profile data in the personalized consumer profiles and item feature sets related to items in the item listings. The item listings can be listings for products or services or both. The personalized consumer profiles, item feature set data, and data defining the association between the user profile data in the personalized consumer profiles and item feature set data may be stored in or retrieved from the context data table 304 of database(s) 136. In one embodiment, each word in a phrase may be a tag linked to another listing and its associated data. For example "Canon" may be a selectable element within the user interface as a tag that results in the selector receiving more general data regarding Canon products. Similarly, "camera" may be selected to receive more general data regarding cameras, in this case both digital and film cameras.

The tables 300 may also include an item list table 306 which maintains listing or item records for goods and/or services that were created using the item list application(s) 216. In various embodiments, the item list may be created and shared with a community group or with all users in part to solicit feedback regarding listed or potential vendors.

Each listing or item record within the item list table 306 may furthermore be linked to one or more electronic shopping cart records within an electronic shopping cart table 308 and to one or more user records within the user table 302 and/or a vendor table 310, so as to associate a seller or vendor and one or more actual or potential buyers from the community group with each item record.

A transaction table 312 may contain a record for each transaction pertaining to items or listings for which records exist within the item list table 306. For example, the transaction table 312 may contain a purchase or sales transaction of an item of the item list by a consumer.

In one example embodiment, a feedback table 314 may be utilized by one or more of the reputation application(s) 204 to construct and maintain reputation information associated with users (e.g., members of the community group, sellers, etc.).

Group(s) of users found in a community group table 316 may be selected by a user to be members of a community group having access to user profile data and an item listing associated with the electronic shopping cart.

A filter table 318 may be used to sort and filter data associated with a listing. The sorted or filtered data are then stored in the result data table 307 and linked to the listing creator via a user profile identifier. Various types of filters and associated rules were discussed above with reference to the filtering application(s) 208 in FIG. 2.

Figure 4:
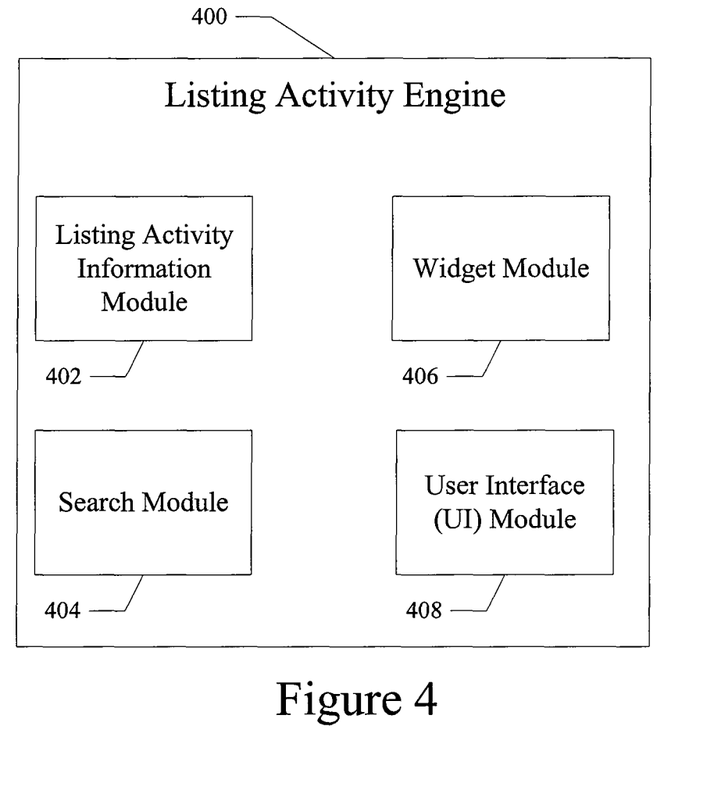
FIG. 4 illustrates an example embodiment of functional modules pertaining to the listing activity engine of a particular embodiment.

FIG. 4 illustrates an example embodiment of functional modules pertaining to the listing activity engine of a particular embodiment. It will be appreciated that the applications and associated modules may be executed within any portion of the network system 100 (e.g., the client machine 122 and the network-based marketplace 112). Additionally, the modules discussed herein are for example only and it can be appreciated that these modules and applications may be combined into one or many modules and applications without departing from the spirit of the methods and systems described herein.

FIG. 4 is a block diagram illustrating an example embodiment of the components of a listing activity engine 400 of a particular embodiment. In the embodiment shown, the listing activity engine 400 includes a listing activity information module 402, a search module 404, a widget module 406, and a user interface (UI) module 408. The listing activity information module 402 can obtain listing activity information associated with a particular listing that may appear in a listing search result. The listing activity information may include information indicative of a number of times a particular listing has been viewed, included in a web page, moused over, selected, clicked on, replied to, activated, or otherwise involved in some user activity. There are conventional methods available for generating this listing activity information. A listing activity level can be determined from the listing activity information. The listing activity information may be included as part of a listing database, a user activity database, or separately stored.

The search module 404 provides the functionality with which a search engine can produce a search result and then filter the search result for listings matching a specified listing activity level. The search module 404 can also provide the functionality with which a search engine can be initially configured to produce a search result containing only listings matching a specified listing activity level. In a particular embodiment, the search module 404 is not itself a search engine. Rather, the search module 404 can be an interface to an existing search engine that can produce a search result as specified by the search module 404.

The widget module 406 can provide the functionality with which a widget can be provided in a dedicated area in a user interface to display listings matching a specified listing activity level. In a particular embodiment, a widget is an element of a graphical user interface (GUI) that displays an information arrangement changeable by the user, such as a window, a text box, or other dedicated area in a user interface. The defining characteristic of a widget is to provide a single interaction point for the direct manipulation of a given kind of data (e.g., listings matching a specified listing activity level). Widgets are basic visual building blocks which, when combined in an application, hold all the data processed by the application and the available interactions on this data.

The UI module 408 provides the functionality for displaying prompts, links, listings, dedicated areas, messages, and other displayed information to a user and for providing user controls to manipulate, select, and configure the displayed information. The functionality provided by modules 402-408 of listing activity engine 400 of a particular embodiment is described in more detail below.

The various embodiments described herein focus on providing computer users with various ways to find particular low-activity listings in a database of listings based on listing activity. The functionality of the various embodiments described herein enables a user to access low-activity listings that are likely still available, because low-activity listings have a low number of views or no views or a low number of replies or no replies. Moreover, if a low-activity listing has been on a host site for some time with few or no views or replies, the seller related to the low-activity listing may be more open to negotiation of a modification to the terms of the item for sale/bid or modification of the listing or its posting.

In various embodiments, low-activity listings can be displayed to users by using one of at least three different implementation methodologies: 1) providing a listing search filter to display low-activity listings, 2) providing an additional listing search option to display low-activity listings, or 3) providing a stand-alone widget to display low-activity listings. Each of these methodologies, as described below, is provided as part of the listing activity engine 400 of a particular embodiment.

Figure 5:
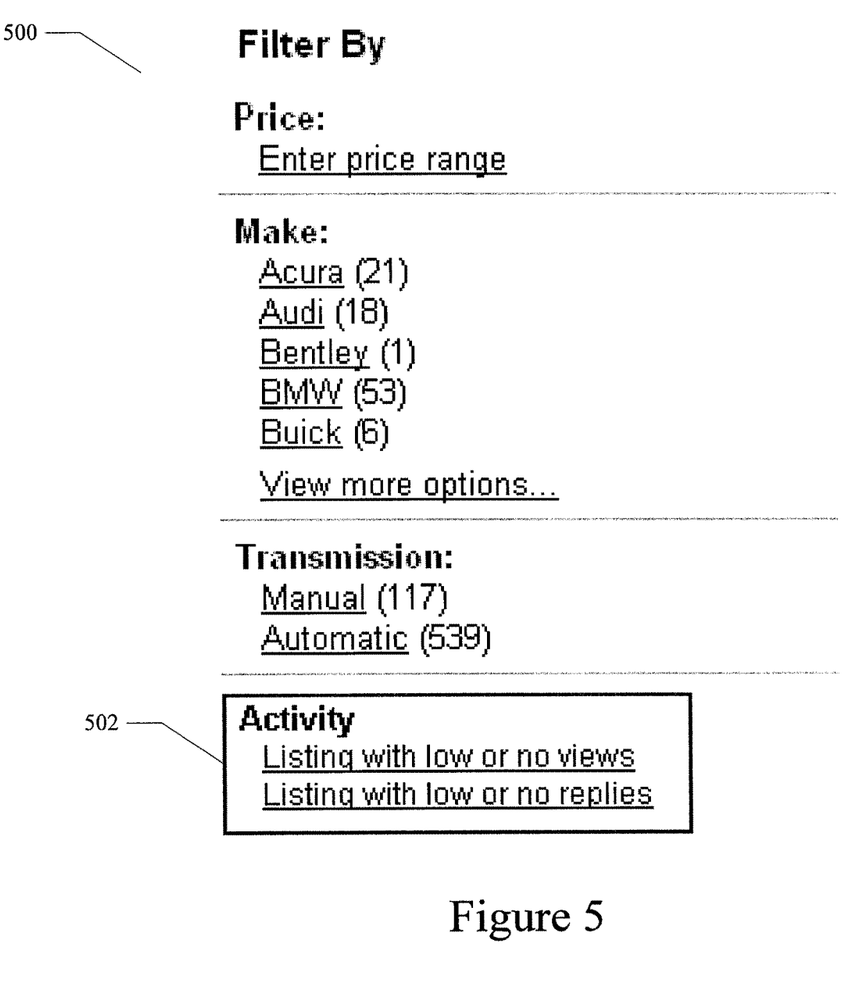
FIGS. 5-7 are sample user interfaces illustrating examples of particular embodiments.

Referring now to FIG. 5, a sample user interface 500 illustrates an example of a particular embodiment for implementing a search filter to display low-activity listings. Implementation of a particular embodiment as a search filter can allow users to perform a search and then to further refine their results by specific criteria. As shown in FIG. 5, these specific criteria can include various characteristics of the items represented by the particular listing (e.g., price, make, transmission, etc.). The specific criteria in the search filter can be expanded in a particular embodiment to also include a listing activity level. In an initial operation, users can submit a search query that produces a search result. In one example, the search result includes a plurality of listings that match the parameters of the search query submitted by the user. Once a search result is produced, the user can further refine the search results by selecting a listing activity level filtering option 502 provided in user interface 500. The listing activity level filtering option 502 enables the user to remove from the search results any listings that are not low-activity listings. The listing activity level filtering option 502 of a particular embodiment also provides two types of listing activity level filtering options: 1) an option to show listings with low or no views, and/or 2) an option to show listings with low or no replies. It will be apparent to those of ordinary skill in the art that other listing activity level filtering options may also be provided as consistent with the teachings provided herein.

Figure 6:
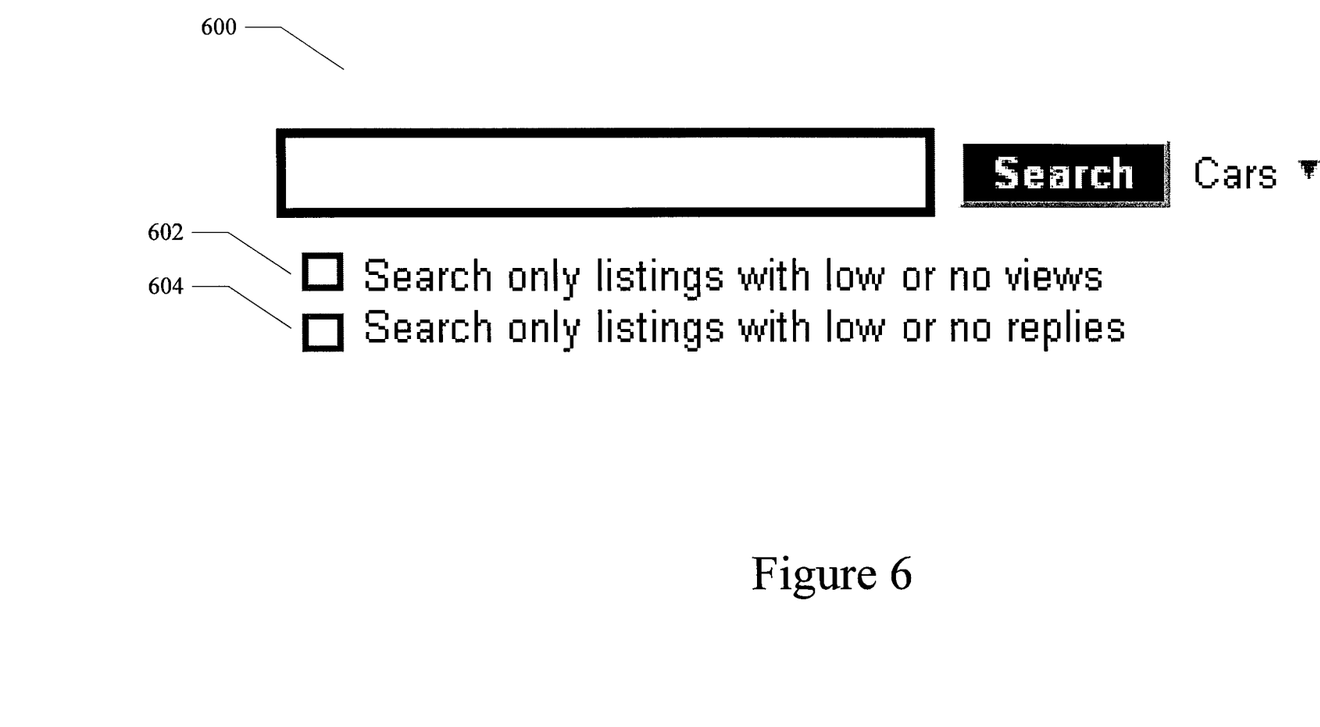

Referring now to FIG. 6, a sample user interface 600 illustrates an example of a particular embodiment for implementing a search option to display low-activity listings. Implementation of a particular embodiment as a search option can allow users to specify a listing activity level filtering option prior to or concurrent with the initial submittal of a search query. As shown in FIG. 6, listing activity search options 602 and 604 allow users to specify a listing activity search criterion when they initiate the search. In the example of FIG. 6, the user can select one or both of the listing activity search options 602 and 604 to cause the search engine to include only listings in the search result that conform to the selected listing activity level. The listing activity level search options 602 and 604 enable the user to initially produce search results that only include listings that are low-activity listings. The listing activity level search options 602 and 604 of a particular embodiment provide two types of listing activity level search options: 1) an option 602 to search listings with low or no views, and/or 2) an option 604 to search listings with low or no replies. It will be apparent to those of ordinary skill in the art that other listing activity level search options may also be provided as consistent with the teachings provided herein.

Figure 7:
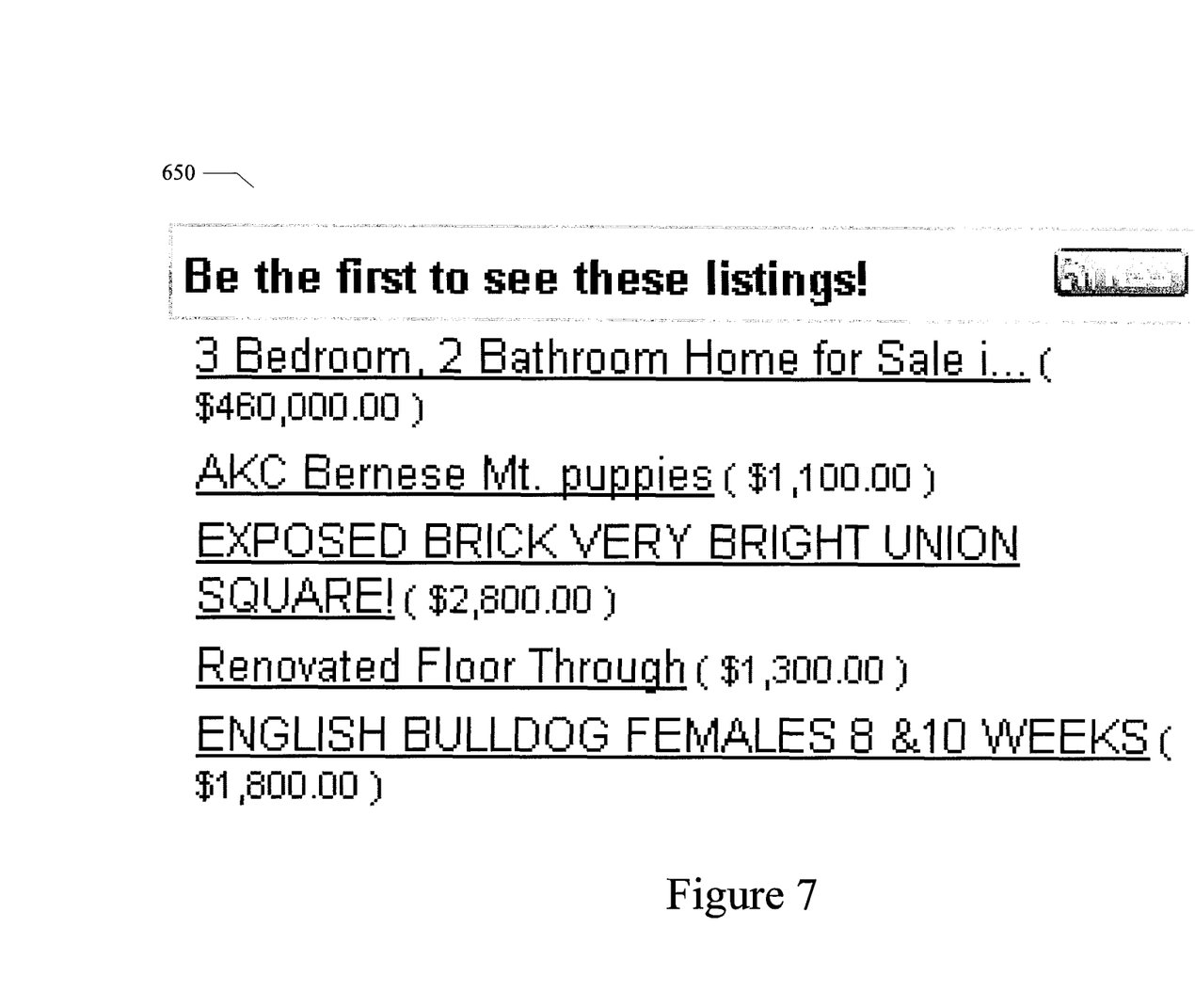

Referring now to FIG. 7, a sample user interface 650 illustrates an example of a particular embodiment for providing a stand-alone widget to display low-activity listings. Implementation of a particular embodiment as a stand-alone widget can allow users to interact with a widget to activate a dedicated user interface area for viewing listings that match a specified listing activity level. An example embodiment of a dedicated user interface area for viewing listings that match a specified listing activity level is shown as user interface 650 in FIG. 7. In the dedicated user interface area 650, users can click a particular listing to view the listing directly without initiating a search. The widget can populate the dedicated user interface area 650 with listings that match a specified listing activity level. It will be apparent to those of ordinary skill in the art that other dedicated user interface areas useable with a widget may also be provided as consistent with the teachings provided herein.

The various embodiments described herein can enable several benefits and features that would otherwise not be available. For example, several monetization opportunities can be enabled by a system that provides a capability to select and display listings based on a listing activity level. A feature that provides a capability to select and display listings based on a listing activity level is valuable to buyers, who are shopping for items represented by the listings. Buyers may be willing to pay for use of the feature so buyers could easily access listings based on a listing activity level. For example, the buyer charge could be a minimal amount for one day and may increase based on a number of days of usage.

In another embodiment, an option can provide users with exclusive rights by category, attribute or keyword to find these low-activity listings. This exclusivity cannot be for too long a duration or it may cause harm to sellers. However, if that exclusivity was measured in minutes, an exclusive rights option can provide enough time for those "lucky" buyers to be the first to view and reply to those hard-to-find items represented by the low-activity listings.

In another embodiment, an option can provide users with notice any time there is a listing that has not been viewed or responded to for x days. This option provides alerts (subscriptions) to the functionality that provides access to the low-activity listings. In this manner, users are automatically notified when listings become low-activity listings based on a listing activity level.

Figure 8:
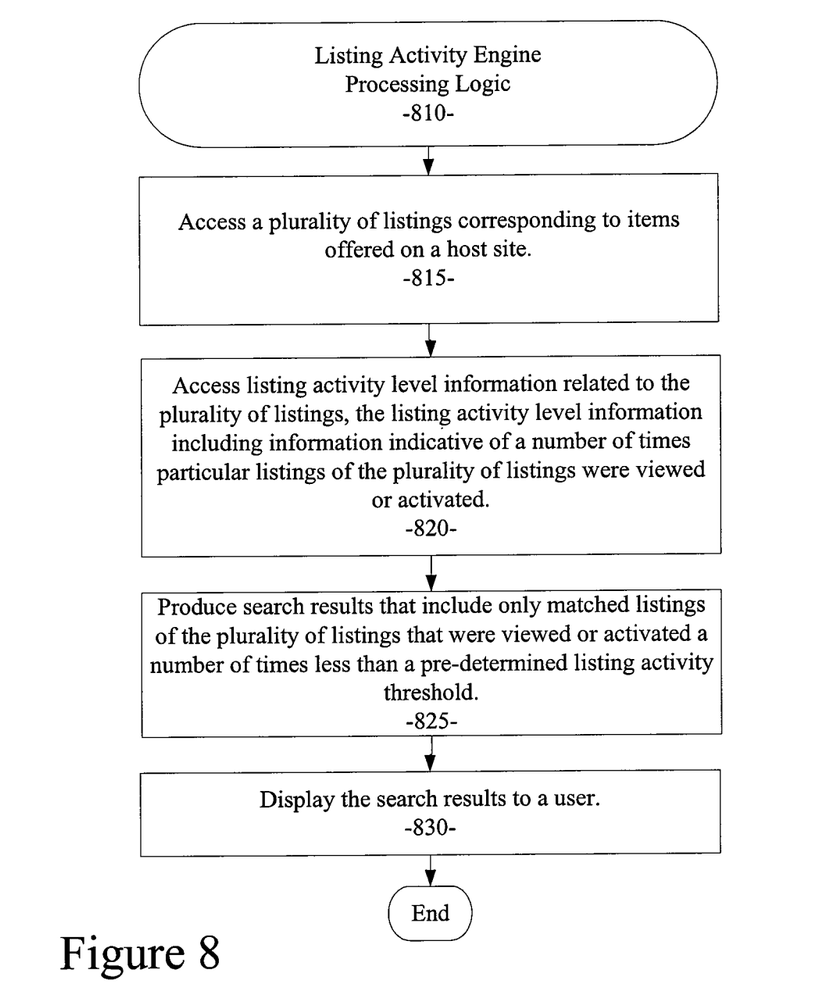
FIG. 8 is a processing flow chart illustrating an example embodiment of a process used in a listing activity engine as described herein.

FIG. 8 is a processing flow chart illustrating an example embodiment 810 of a listing activity engine as described herein. The method of an example embodiment includes: accessing a plurality of listings corresponding to items offered on a host site (processing block 815); accessing listing activity level information related to the plurality of listings, the listing activity level information including information indicative of a number of times particular listings of the plurality of listings were viewed or activated (processing block 820); producing search results that include only matched listings of the plurality of listings that were viewed or activated a number of times less than a pre-determined listing activity threshold (processing block 825); and displaying the search results to a user (processing block 830).

Figure 9:
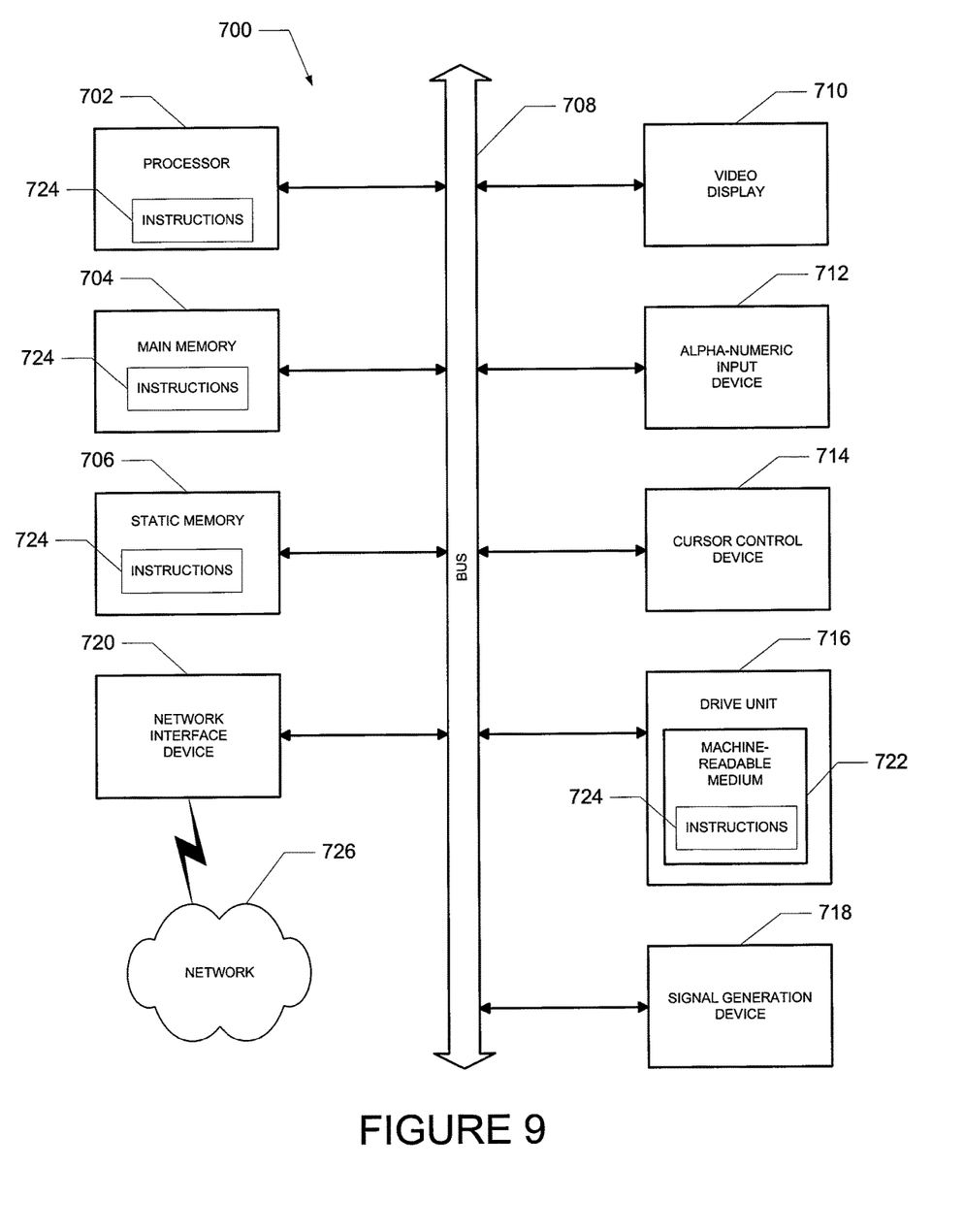
FIG. 9 shows a diagrammatic representation of machine in the example form of a computer system within which a set of instructions when executed may cause the machine to perform any one or more of the methodologies discussed herein.

FIG. 9 shows a diagrammatic representation of a machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method for an improved user interface for displaying listings from a listing database on a display screen of a user device, the method comprising:
   storing, in the listing database, a plurality of listings of items offered on a host site and listing activity information for each of the listings;
   querying the listing database to generate a plurality of search results in response to a search query, the plurality of search results including a portion of the plurality of listings included in the listing database;
   providing, for display on the display screen of the user device, a user interface with the plurality of search results and a listing search option to display low-activity listings; and
   in response to a selection of the listing search option to display low-activity listings, updating the user interface to display low-activity listings by removing listings with listing activity information indicating activity above a threshold.

2. The method of claim 1, wherein the listing activity information for a respective listing is indicative of a number of times the respective listing has been viewed, and wherein the listings removed from the user interface are listings with listing activity information indicating the listing has been viewed a number of times above the threshold.

3. The method of claim 1, wherein the listing activity information for a respective listing is indicative of a number of replies for the respective listing, and wherein the listings removed from the user interface are listings with listing activity information indicating the listing has a number of replies above the threshold.

4. The method of claim 1, wherein the listing activity information for a respective listing is indicative of a number of bids the respective listing has received, and wherein the listings removed from the user interface are listings with listing activity information indicating the listing has received a number of bids above the threshold.

5. The method of claim 1, wherein the listing activity information for a respective listing is indicative of a number of offers the respective listing has received, and wherein the listings removed from the user interface are listings with listing activity information indicating the listing has received a number of offers above the threshold.

6. The method of claim 1, wherein the listing activity information for a respective listing is indicative of a number of users who have indicated an interest in watching activity for the respective listing, and wherein the listings removed from the user interface are listings with listing activity information indicating the listing has a number of users who have indicated an interest in watching activity above the listing above the threshold.

7. The method of claim 1, wherein the method further includes charging a user for filtering the search results.

8. The method of claim 1, wherein the method further includes charging the user for exclusive use for a predetermined duration of functionality to filter the search results.

9. A system comprising:
   a memory device for storing instructions; and
   one or more processors, which, when executing the instructions, causes the system to perform operations comprising:
   storing, in a listing database, a plurality of listings of items offered on a host site and listing activity information for each of the listings;
   querying the listing database to generate a plurality of search results in response to a search query, the plurality of search results including a portion of the plurality of listings included in the listing database;
   providing, for display on a display screen of a user device, a user interface with the plurality of search results and a listing search option to display low-activity listings; and
   in response to a selection of the listing search option to display low-activity listings, updating the user interface to display low-activity listings by removing listings with listing activity information indicating activity above a threshold.

10. The system of claim 9, wherein the operations further include charging a user for filtering the search results.

11. The system of claim 9, wherein the operations further include charging the user for exclusive use for a predetermined duration of functionality to filter the search results.

12. The system of claim 9, wherein the listing activity information for a respective listing is indicative of a number of times the respective listing has been viewed, and wherein the listings removed from the user interface are listings with listing activity information indicating the listing has been viewed a number of times above the threshold.

13. The system of claim 9, wherein the listing activity information for a respective listing is indicative of a number of replies for the respective listing, and wherein the listings removed from the user interface are listings with listing activity information indicating the listing has a number of replies above the threshold.

14. The system of claim 9, wherein the listing activity information for a respective listing is indicative of a number of bids the respective listing has received, and wherein the listings removed from the user interface are listings with listing activity information indicating the listing has received a number of bids above the threshold.

15. The system of claim 9, wherein the listing activity information for a respective listing is indicative of a number of offers the respective listing has received, and wherein the listings removed from the user interface are listings with listing activity information indicating the listing has received a number of offers above the threshold.

16. The system of claim 9, wherein the listing activity information for a respective listing is indicative of a number of users who have indicated an interest in watching activity for the respective listing, and wherein the listings removed from the user interface are listings with listing activity information indicating the listing has a number of users who have indicated an interest in watching activity above the listing above the threshold.

17. A non-transitory machine-useable medium embodying instructions which, when executed by one or more processors of a machine, cause the machine to perform operations comprising:

storing, in the listing database, a plurality of listings of items offered on a host site and listing activity information for each of the listings;

providing, for display on a display screen of a user device, a user interface for receiving a search query, the user interface including a listing search option to display low-activity listings;

receiving, via the user interface, user input submitting the search query and selecting the listing search option to display low-activity listings;

querying the listing database to generate a plurality of search results based on the user input, the plurality of search results including a portion of the plurality of listings included in the listing database that correspond to the search query and are determined to be low-activity listings based on listing activity information indicating activity below a threshold; and providing, for display on the display screen of the user device, the plurality of search results.

18. The machine-useable medium of claim 17, wherein the listing activity information for a respective listing is based on one or more selected from the following: a number of times the respective listing has been viewed, a number of replies for the respective listing, a number of bids the respective listing has received, a number of offers the respective listing has received, and a number of users who have indicated an interest in watching activity for the respective listing.

19. The machine-useable medium of claim 13, wherein the operations further comprise charging a user for use of functionality to filter the search results to exclude listings with listing activity information indicating the listing has been viewed a number of times that is above the threshold.

20. The machine-useable medium of claim 13, wherein the operations further comprise charging a user for exclusive use for a predetermined duration of functionality to filter the search results to exclude listings with listing activity information indicating the listing has been viewed a number of times that is above the threshold.

* * * * *